UNITED STATES PATENT OFFICE.

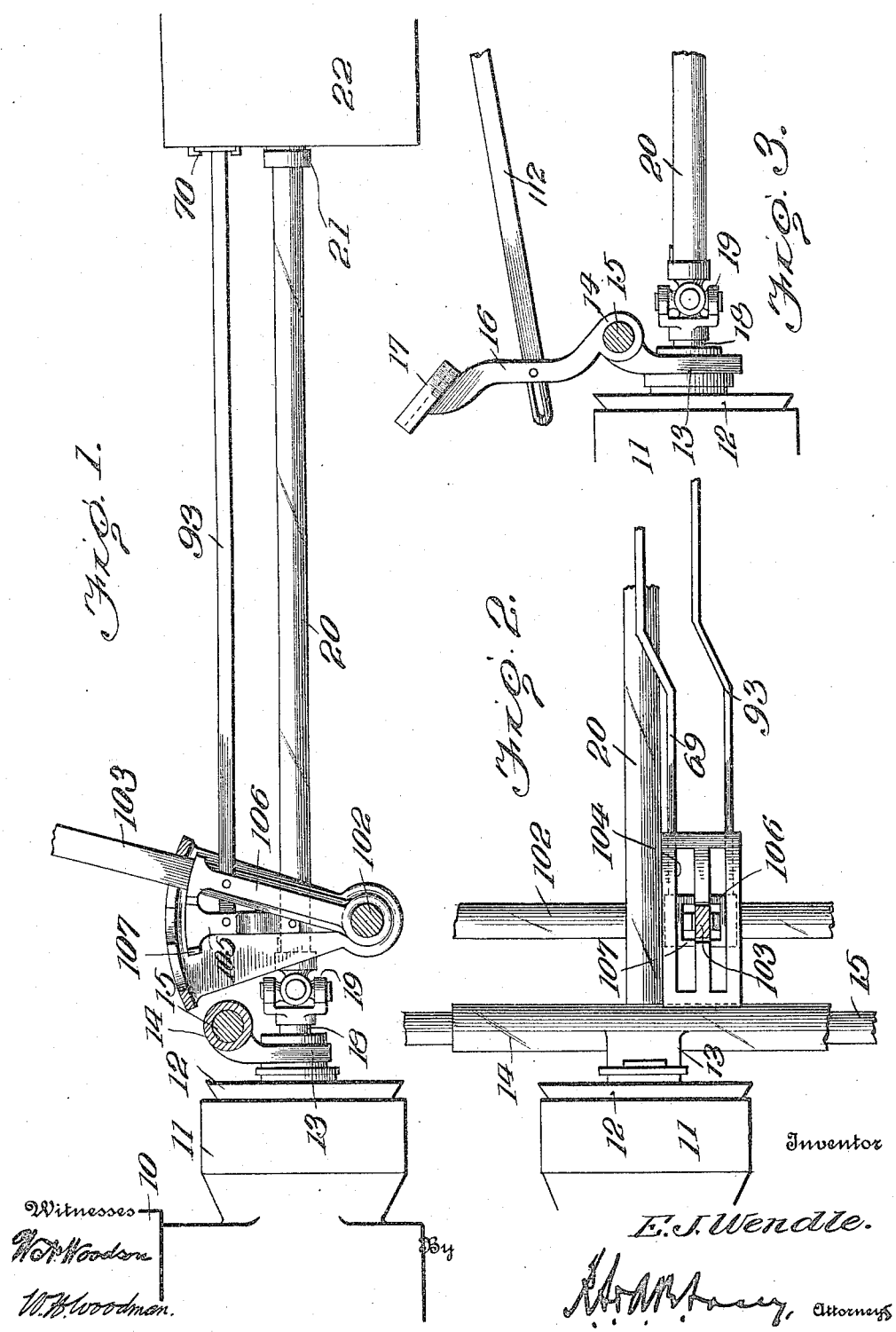

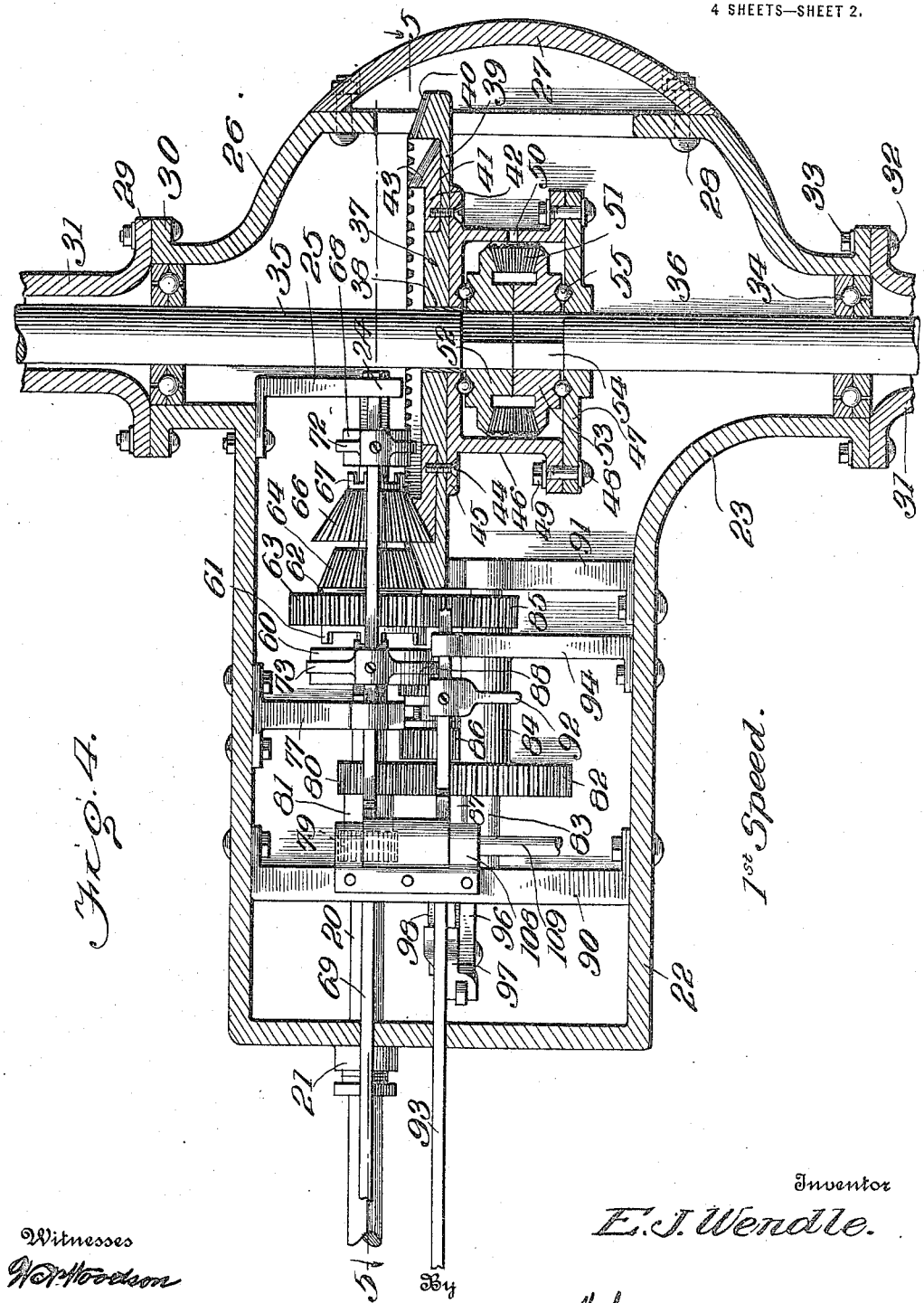

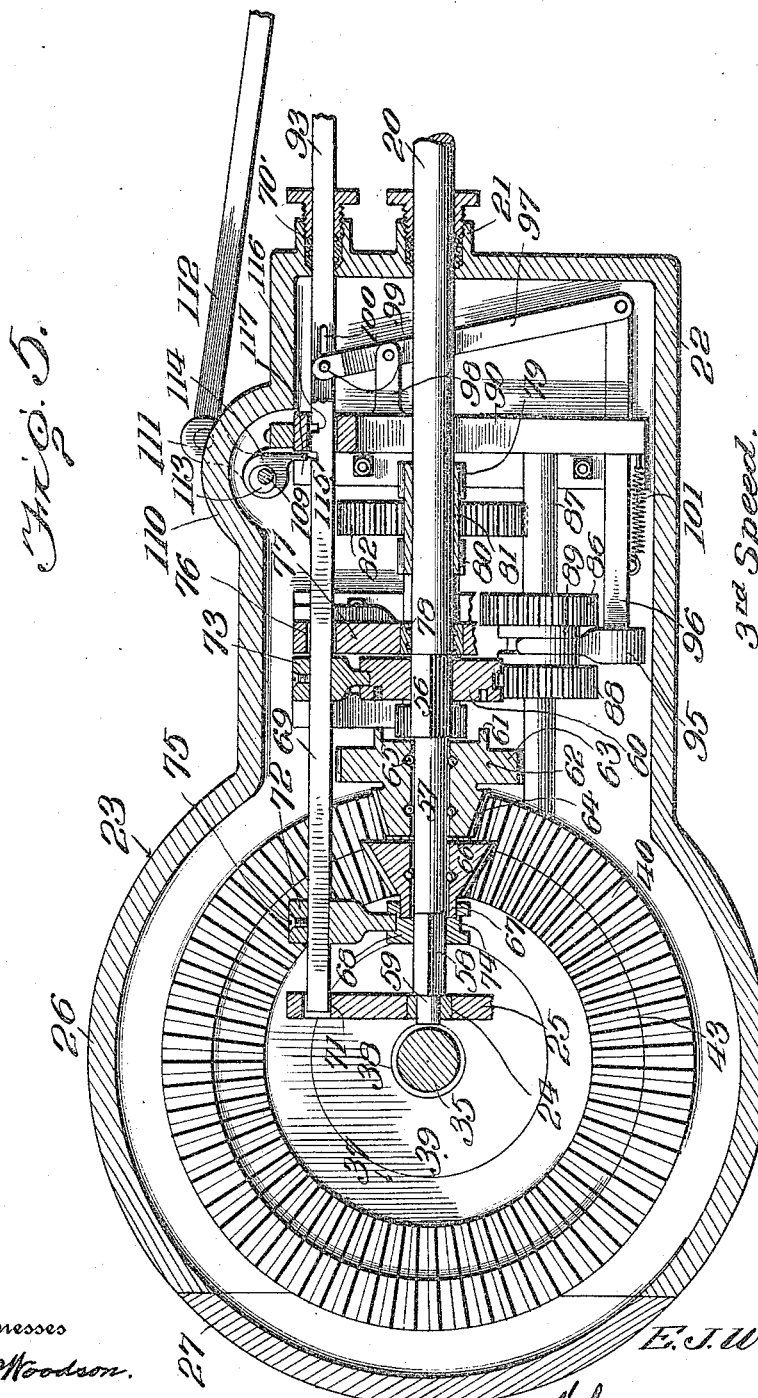

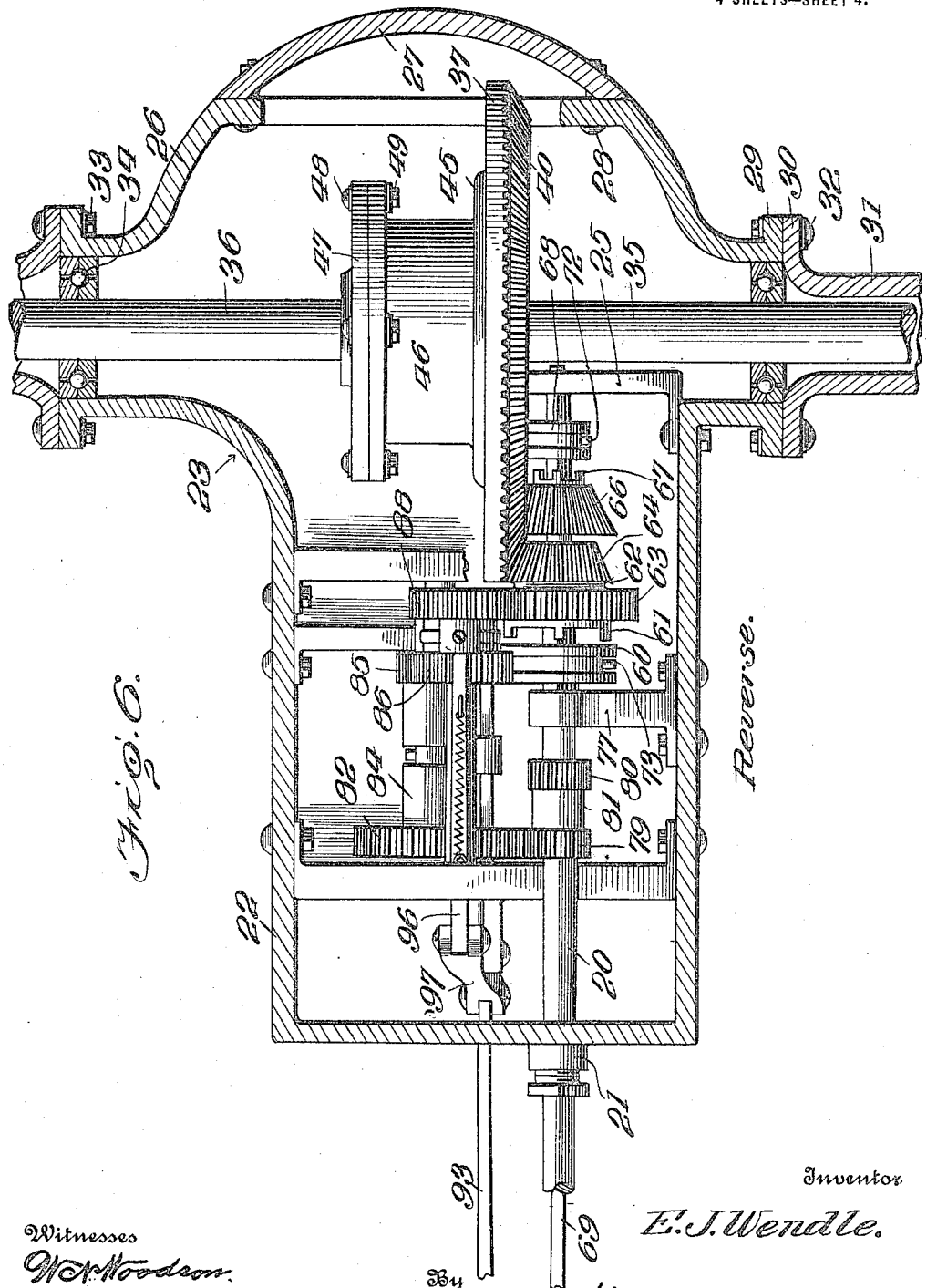

EDGAR J. WENDLE, OF JOHNSTOWN, PENNSYLVANIA.

POWER-TRANSMISSION MECHANISM.

1,183,331.  Specification of Letters Patent.  Patented May 16, 1916.

Application filed May 1, 1915. Serial No. 25,274.

*To all whom it may concern:*

Be it known that I, EDGAR J. WENDLE, a citizen of the United States, residing at Johnstown, in the county of Cambria and State of Pennsylvania, have invented certain new and useful Improvements in Power-Transmission Mechanisms, of which the following is a specification.

My present invention relates to new and useful improvements in power transmission mechanisms for self-propelled vehicles, the main object of my invention being the provision of a variable speed power transmission mechanism which will be simple in construction and operation and at the same time efficient and reliable.

My improved power transmission mechanism is of that general type in which the transmission gearing and differential mechanism are both incorporated in the rear axle housing into which the drive or propeller shaft leads, such shaft being provided with a single universal joint to compensate for changes in level between the engine and axle. For this reason, a further object of my invention is the provision of a transmission mechanism in which a single, compound multiple gear replaces all the driven gears common to transmission mechanisms, thus economizing in space. In this connection a still further object of my invention is the provision of a multiple driven gear mounted for free rotation upon one of the live axle sections, but held against longitudinal movement thereon and constructed to directly carry and form part of the cage inclosing the differential gearing.

Another object of my invention is to provide a transmission gearing of the selective speed type so constructed and arranged and with such a control mechanism that the various speed changes may be obtained by the use of a single gear lever operating in an H-plate of conventional construction in connection with the usual resilient locking arms engaging such lever to secure it in its various positions.

A yet further object of my invention is the provision of a lock for the transmission gearing operable by and in conjunction with the clutch and so arranged that the gears are always locked in selected position when the clutch is in active position, this as a result preventing all changing of the transmission gears while the driving shaft is being driven by the engine. Furthermore, this locking of the transmission gearing by the clutch is such that the clutch is prevented from moving to active position of the various gears of the transmission mechanism if the gear clutches thereof are not in proper position, thereby doing away with the liability of injury to the gears and clutches, due to improper manipulation of the transmission mechanism by an inexperienced or confused driver.

A still further object of this invention is the provision of a transmission mechanism having two or more direct speed drives, one or more indirect speed drives and a reverse speed drive, all being of standard gear ratio and road clearance and the direct speed drives being such that the indirect speed drives need only be used in case of emergency. In this connection, a still further object of my invention is to simplify the transmission and render it more compact, for a transmission mechanism of equal number of speeds, by so arranging the mechanism that one of the gears employed serves to transmit power for one of the direct drives, one of the indirect drives and the reverse speed drive.

Still further objects of my invention are the doing away with sliding gears in the direct speed drives, substituting clutches therefor, in so arranging the transmission mechanism that it can be used in whole or in part in conjunction with chain drive or other reduction gears for all purposes requiring a variable speed change mechanism and so arranged that no idle gears are engaged.

My invention further contemplates the provision of a transmission mechanism of such a nature that the rear axle of the vehicle can revolve without turning the drive shaft and the drive shaft can revolve without turning the gears of the transmission mechanism.

With these and other objects in view, my invention will be more fully described, illustrated in the accompanying drawings, and then specifically pointed out in the claims which are attached to and form a part of this application.

In the drawings: Figure 1 is a fragmentary side elevational view, illustrating the control mechanism of my transmission gearing; Fig. 2 is a fragmentary top plan view of a portion of the control mechanism, showing the gear shifting lever in neutral position; Fig. 3 is a side elevational view of the structure shown in Fig. 2; Fig. 4 is a horizontal sectional view taken through the transmission housing and certain of the gears contained therein, the controlling mechanism and remaining gears being shown in top plan view; Fig. 5 is a vertical sectional view taken on the line 5—5 of Fig. 4; Fig. 6 is a horizontal sectional view taken through the transmission housing, showing the transmission mechanism in bottom plan view to illustrate the reverse drive mechanism.

Corresponding and like parts are referred to in the following description and indicated in all the views of the drawings by the same reference characters.

In order to insure a clear and accurate understanding of my invention and its application, I have illustrated it in connection with a gas engine 10 of conventional type having a fly wheel 11 which includes a clutch 12, the movable member of this clutch being reciprocated through the medium of a shipper yoke 13 carried by a sleeve 14 journaled upon a supporting shaft 15 carried by the frame of the vehicle, this shaft being provided with an arm 16 which extends through the floor of the vehicle and carries a foot pedal 17. The shaft section 18, leading from the clutch, is connected by a universal joint 19 of conventional or any preferred type with the drive or propeller shaft 20, the rear end of which extends through a stuffing box 21 formed in the forward end of the transmission housing 22, which housing is connected directly to the rear axle and differential housing, indicated as a whole by the numeral 23. The extreme rear end of the drive shaft 20 is journaled in a cap bearing 24 carried by a bracket 25 mounted within the transmission housing.

The rear axle and differential housing 23 is of substantially conventional type including a body portion 26 adapted to inclose the differential mechanism, and also a portion of the transmission mechanism, and having an opening in its rear face normally closed by a cap plate 27 secured by bolts 28, this cap plate permitting inspection of the gearing, when necessary. The ends of the body portion 26 of the housing are flanged, as shown at 29, to receive the mating flanges 30 of the rear axle housing members 31, the rear axle housing members and differential housing being secured by bolts 32 passed through these mating flanges and secured by nuts 33. The differential housing, immediately adjacent the rear axle housing, is provided with radial ball bearings 34 to receive the live, rear axle sections 35 and 36. These rear axle sections are of the full floating type and no further description of the manner of mounting them is therefore believed to be necessary, although it should be noted that one of these sections, in the present instance the section 35, is longer than the other in order to position the differential gearing at one side of the drive or propeller shaft 20. This longer axle section 35 carries a multiple gear, indicated as a whole by the numeral 37, this gear being rotatably mounted upon the axle section adjacent its inner end, a bushing 38 being preferably interposed between the axle section and multiple gear to prevent undue wearing of the parts. This multiple gear 37, in the present instance, includes a circular body 39 having that face directed toward the outer end of the axle section 35 cut to provide a beveled gear 40 and channeled to provide a concentric annular seat 41 to receive a ring 42 cut to provide a beveled gear 43 concentric with the beveled gear 40. Bolts 44 are passed through the peripheral flange 45 of one wall of the differential housing 46, through the body portion 39 of the multiple gear and into the body portion 42 of the inner beveled gear 43. These bolts therefore serve to secure the differential casing to the multiple gear and to secure the annular gear ring to the body of the multiple gear. This differential housing or cage is closed at its opposite end by a face plate 47 which is secured to the cage by bolts 48 and nuts 49, this face plate being provided centrally with an opening to receive the axle section 36.

A plurality of stub shafts 50 extend inwardly and radially from the peripheral wall of the cage 46 and carry small beveled pinions 51, each of which meshes with both of the beveled gears 52 and 53 mounted upon the abutting ends of the live axle sections 35 and 36. The ends of the axle sections are squared, as shown at 54, to seat in the squared bores of the beveled gears 52 and 53 to lock the beveled gears against rotation independent of the axle sections and also to prevent movement of either of such gears toward the outer end of its axle section, movement in the opposite direction being prevented by engagement with the beveled pinions 51. For this reason, the multiple gear 37 is locked against movement toward the outer end of its axle section and also against movement toward the other axle section. Suitable anti-friction bearings 55 may be interposed between the outer faces of the beveled gears 52 and 53 and the adjacent walls of the differential mechanism cage 46.

The shaft section 20 is provided within the housing 23 and adjacent the peripheral portion of the multiple gear with a reduced squared portion 56 and to the rear of this with a further reduced cylindrical portion 57 and again beyond this with a further reduced squared portion 58 and still further with a reduced cylindrical portion 59, the latter portion seating in the bearing 24. The squared hub of a clutch member 60 engages upon the reduced squared portion 56 of the shaft and is movable to engage with the clutch teeth 61 carried by a compound gear 62 which seats upon the rounded portion 57 of the shaft. This compound gear 62 includes a spur gear 63 and a beveled gear 64, the latter of which meshes with the beveled gear 40 of the multiple gear 37. This compound gear is provided with any suitable form of non-friction bearing 65. The cylindrical portion 57 of the shaft 20 also carries a beveled gear 66 which meshes with the beveled gear 43 of the multiple gear 37 and which has clutch teeth 67 engageable by a clutch member 68 slidably mounted upon the reduced squared portion 58 of the shaft 20.

A control rod 69 extends through a stuffing box 70 in the front end of the housing 23 and its inner end is reciprocally supported in the upper end of the bracket 25, as shown at 71. This control rod carries the clutch shifting forks 72 and 73, the fingers of which engage in the annular grooves 74 of the clutch members 60 and 68, the forks being secured in proper relative position upon the control rod 69 by set bolts 75 or other suitable means. This control rod 69 also reciprocates through a guide 76 formed in a bracket 77 which is also provided with any suitable anti-friction bearing 78 furnishing an additional support for the propeller or drive shaft 20.

Mounted upon the drive shaft 20 in advance of the bearing 78, being keyed or otherwise secured to rotate with the shaft, are spur gears 79 and 80 preferably formed integrally with each other, being connected by a sleeve 81. These gears may be formed by cutting teeth the entire length of the body 81 and by then cutting away the teeth intermediate the length of such body to form the sleeve. It is of course understood that they may also be separate gears, if preferred. Co-acting with these gears 79 and 80 and movable to selective engagement with either, is a larger spur gear 82 which is mounted for idle rotation upon a jack shaft 83. Preferably formed integrally with this gear 82, being connected thereto by a sleeve 84, is a pinion 85 which, when the gear 82 meshes with the gear 80, meshes with the spur gear 63 of the compound gear 62. On the other hand, when the gear 82 meshes with the gear 79, the gear 85 moves out of mesh with the spur gear 63 and into mesh with a gear 86 idly mounted for free rotation upon a second jack shaft 87 and preferably formed integrally with a second spur gear 88 to which it is connected by means of a sleeve 89, the second spur gear 88 meshing with the gear 63 when the spur gear 86 meshes with the spur gear 85. Spaced brackets 90 and 91 carry bearings for the jack shafts 83 and 87.

The sleeve 84 connecting the gear 82 and pinion 85 is channeled peripherally to receive the arms of a shipper fork 92 which is carried by and secured to a second control rod 93 passing through a stuffing box 70′ in the transmission housing and reciprocable through bearings in the brackets 77 and a bracket 94. In like manner, the sleeve 89 connecting the gears 86 and 88 is peripherally channeled to receive the arms of a shipper fork 95 carried by one end of a link 96 reciprocally mounted in the bracket 90 and connected at its forward end to one end of a lever 97 which is pivoted between spaced ears 98 extending from the bracket 90, in such a manner that it may be reciprocated by swinging of the lever. The lever 97 is bifurcated at its opposite end to receive the control rod 93 and a pin 99 is passed through such end of the lever and a slot 100 in the control rod 93. A helical spring 101 connects the bracket 90 with the link 96 and normally tends to hold the gears 86 and 88 out of mesh with the gears 85 and 63, respectively.

As a means for actuating the control rods 69 and 93, I provide a shaft 102 which extends transversely of the frame of the vehicle and swingingly mounted upon this shaft is a hand control lever 103 which projects through the H-slot 104 located in the floor of the vehicle, as clearly shown in Fig. 2 of the drawings, in neutral position seating as shown in such figure. Resilient arms 105 and 106 are swingingly mounted about the shaft 102, one upon either side of the control lever 103 and are formed with U-shaped upper terminals 107 so arranged that swinging of the hand lever 103 into either of the longitudinal branches of the H-slot will cause it to seat between the fingers of such terminal of the adjacent spring arm, whereby subsequent forward or rearward swinging of the hand control lever will cause corresponding swinging of the engaged spring arm 105 or 106, as the case may be. The control rods 69 and 93 are pivotally connected to intermediate portions of the spring arms 105 and 106, respectively.

From the foregoing description, it will be apparent that if the lever 103 is engaged with the spring arm 106 and drawn rearwardly to the full extent of its movement, the control rod 93 will move rearwardly and through its shipper fork 92 will move the gear 82 into mesh with the gear 80 and the gear 85 into mesh with the gear 63. Under these conditions, the propeller shaft 20 will transmit power to the gear 82, from this gear to the gear 85 and from this gear to the compound gear 62, the beveled gear 64 of which will transmit power to the multiple gear 37 to drive the rear axle sections 35 and 36. This transmission of power constitutes the low speed drive of my transmission mechanism. On the other hand, if the control lever 103 is moved into engagement with the spring arm 105 and then swung rearwardly to the full extent of its movement, the rearward movement transmitted by it to the control rod 69 will act through the shipper fork 73 to move the clutch member 60 into locking engagement with the compound gear 62 to lock such gear to the propeller shaft 20 when power will be transmitted directly from such shaft to the multiple gear 37, the beveled pinion 64 driving the beveled gear 40 of the multiple gear. This constitutes the intermediate speed drive position of my transmission mechanism. Again, if the control lever 103, when brought into engagement with the resilient arm 105, be swung forwardly, instead of rearwardly, the shipper lever 72 of the control rod 69 will bring the clutch member 68 into locking engagement with the beveled pinion 66 to lock such pinion to the drive shaft section 20, whereby power will be transmitted directly from the drive shaft through this beveled pinion to the beveled gear 43 of the multiple gear 37 which constitutes the high speed drive position of my transmission mechanism. If the hand control lever 103 is swung into engagement with the resilient arm 106 and then moved forwardly to its full extent, the control rod 93 will act to bring the spur gear 82 into mesh with the pinion 79 of the drive shaft 20 and the pinion 85 into mesh with the gear 86 of the jack shaft 87 and the gear 88 into mesh with the spur gear 63 of the compound gear 62. Under these conditions, power will be transmitted from the drive shaft 20 through the pinion 79 to the gear 82, from this gear to the pinion 85, from this pinion to the gear 86 which, in turn, drives the gear 88 which transmits power to the compound gear 62 and so to the beveled gear 40 of the multiple gear 37. This constitutes the reverse speed drive position of my transmission mechanism.

Having thus described the transmission proper, together with its control mechanism, I will now explain the locking mechanism employed to lock the gears in whichever position they may be set. This mechanism includes a bracket 108 carried by the bracket 90 and having spaced ears in which is journaled a rock shaft 109, one end of which projects through a stuffing box formed in an extended portion 110 of the casing and carries a crank arm 111, a link 112 connecting the free end of this crank arm with the intermediate portion of the shank 16 of the clutch pedal 17. Keyed or otherwise secured upon that portion of the shaft 109 between the ears of the bracket 108, is an eccentrically disposed cylindrical cam 113 which engages in the bore of a locking member 114 which extends transversely across both of the control rods 69 and 93 and which is provided with a downwardly depending rib 115 adapted to seat in notches 116 formed in the upper faces of the control rods 69 and 93 when the crank arm 111 is swung rearwardly by letting in of the clutch 12. The bracket 90 preferably carries a guide 117 to properly direct the movement of the locking member 114 and hold it against undue swinging during turning of the cam shaft. It will of course be understood that both of the control rods 69 and 93 are provided with notches 116 at such intervals that in all positions of the control mechanism, each rod will have a notch disposed in the path of movement of the locking member. At this point it should be noted that the link 112 is slotted at that end which pivotally engages the shank of the clutch pedal in such a manner that the clutch pedal may be moved a sufficient distance to release the clutch and still leave the gears locked, the gears being released only upon a full movement of the clutch pedal and, consequently, also locked before the clutch is fully let in.

From the foregoing description, taken in connection with the drawings, the operation of my improved transmission gearing will be readily understood and but a brief description is therefore deemed necessary. This operation can best be described by assuming that the transmission mechanism is in neutral position and that the clutch is in active position, that is, that the parts are as they would be when the driver approaches the car, the control lever 103, at that time, occupying the cross slot in the H-plate, as shown in Fig. 2, and the control rods being locked against movement by the locking member 114. Under these conditions, the gears and pinions of both jack shafts are out of mesh with each other and with any of the gears of the drive or propeller shaft 20. Furthermore, the clutch members 60 and 68 are both out of engagement with the compound gear 62 and beveled pinion 66, respectively. It will, therefore, be seen that the drive shaft 20 may be driven without transmitting any power to the rear axle sections 35 and 36 and the engine may therefore be started in the usual manner. With the engine running, the driver throws in the low speed gear by first swinging the clutch pedal forwardly to its full extent to release the control rods 69 and 93, by then swinging the hand control lever 103 into engagement with the spring arm 106 and then rearwardly to the extreme rear end of the H-slot, forcing the control rod 93 rearwardly to bring its gear 82 into mesh with the pinion 80 of the drive shaft 20 and its pinion 85 into mesh with the spur gear 63 of the compound gear 62. When the lever has been moved to this position, the clutch is released or let in to active position to lock both control rods and so lock the gears in the selected position. As soon as sufficient vehicle speed has been attained, the clutch is again thrown out to unlock the gears and the hand lever moved forwardly through the cross slot of the H-plate to the extreme rear end of the opposite side of the H-slot, carrying with it the spring arm 105. This movement of the hand lever first returns the gears 82 and 85 to their normal position and subsequently moves the clutch member 60 into locking engagement with the compound gear 62. Upon again letting in the clutch, the gears are locked in this position, which is the intermediate speed drive position of the transmission mechanism, power being transmitted from the drive shaft directly to the beveled gear 40 of the multiple gear 37 by means of the beveled pinion 64 which is locked to the drive shaft. The high speed setting of the transmission mechanism is obtained by swinging the hand control lever forwardly to the full extent of its movement, the first part of this movement acting through the spring arm 105 to disengage the clutch member 60 from the compound gear 62 and the latter part of the movement bringing the clutch member 68 into locking engagement with the beveled pinion 66, the transmission of power being from this beveled pinion to the beveled gear 43 of the multiple gear 37.

In order to reverse the direction of movement of the vehicle, the clutch is thrown out in the usual manner, and the gear lever, while in engagement with the spring arm 106, is moved to the extreme forward end of the H-slot. This movement brings the spur gear 82 into mesh with the pinion 79 of the drive shaft, the pinion 85 into mesh with the spur gear 86 and the spur gear 88 into mesh with the spur gear 63 of the compound gear 62. It will of course be understood that the clutch pedal is manipulated in the usual manner both before and after making this change.

One of the chief advantages of my transmission mechanism is the fact that, with the exception of the reverse drive and one or more indirect speed drives, which need not, as a rule, be employed, all speeds are obtainable by a direct drive instead of through the medium of idle gears and that, with the above exceptions, all driving gears are constantly in mesh with the gears which they drive, these features doing away with practically all the difficulties ordinarily met with in connection with sliding gear transmission mechanisms. Furthermore, my improved transmission mechanism is very simple and unusually compact, this being largely due to the fact that the compound gear 62 not only provides one of the direct drives, but an indirect drive and reverse drive.

It will of course be apparent that any number of intermediate speeds may be provided by multiplying the number of beveled gears loosely carried by the drive shaft 20 and correspondingly increasing the number of concentric beveled gears carried by the multiple gear 37, such changes being well within the skill of an ordinary mechanic. In other words, it will be understood that various changes in details of construction may be made and that the transmission mechanism may be somewhat modified to adapt it for use upon vehicles of different types providing these changes are within the scope of the appended claims, without in the slightest degree departing from the spirit of my invention. Therefore, I do not wish in any way to limit myself to the specific details of construction, illustrated in the drawings and described in the specification, these drawings being merely a disclosure of a preferred form of my invention.

Having thus described the invention, what is claimed as new is:

1. In a power transmission mechanism, a beveled gear, a drive shaft, a compound gear mounted for rotation upon the drive shaft and including a spur gear and a beveled pinion, the latter at all times meshing with the beveled gear, means for locking the compound gear to the drive shaft, and additional means for transmitting power from the drive shaft to the compound gear when the latter is released from the drive shaft, said additional means including a pinion carried by the drive shaft, a jack shaft, a gear carried by the jack shaft and movable into mesh with the pinion of the drive shaft, and a pinion carried by the jack shaft and simultaneously movable into mesh with the spur gear of the multiple gear.

2. In a power transmission mechanism, a beveled gear, a drive shaft, a compound gear freely rotatable upon the drive shaft including a spur gear and a beveled pinion, the latter meshing with the beveled gear at all times, and means for transmitting power to the beveled pinion, said means including a pair of jack shafts, gears on all shafts, means for shifting the gears of both jack shafts thereby transmitting power from the drive shaft to the first jack shaft, from the first jack shaft to the second, and from the second jack shaft to the compound gear.

3. In a power transmission mechanism, a multiple gear including concentrically arranged beveled gears, a drive shaft, beveled pinions loosely mounted on the drive shaft and each meshing with one of the beveled gears of the multiple gear, a spur gear carried by one of the beveled pinions and rotating therewith, means normally leaving the beveled pinions free but movable to selectively lock either to the drive shaft, additional means selectively movable into operative position to transmit power from the drive shaft to the spur gear when its beveled pinion is free of the drive shaft to turn the spur gear in one direction, and further means operable under other conditions to transmit power from the drive shaft to the spur gear to turn the latter in reverse direction.

4. In a power transmission mechanism, a multiple gear including concentrically arranged beveled gears, a drive shaft, beveled pinions loosely mounted on the drive shaft and each meshing with one of the beveled gears of the multiple gear, a spur gear carried by one of the beveled pinions and rotating therewith, means normally leaving the beveled pinions free, but movable to selectively lock either to the drive shaft, additional means selectively movable into operative position to transmit power from the drive shaft to the spur gear when its beveled pinion is free of the drive shaft to turn the spur gear in one direction, further means operable under other conditions to transmit power from the drive shaft to the spur gear to turn the latter in reverse direction, and a single means for locking all of the above means when any one of them is in active position.

5. In a power transmission mechanism, a multiple gear including concentrically arranged beveled gears, a drive shaft, beveled pinions loosely mounted on the drive shaft and each meshing with one of the beveled gears of the multiple gear, a spur gear carried by one of the beveled pinions and rotating therewith, means normally leaving the beveled pinions free, but movable to selectively lock either to the drive shaft, additional means selectively movable into operative position to transmit power from the drive shaft to the spur gear when its beveled pinion is free of the drive shaft to turn the spur gear in one direction, further means operable under other conditions to transmit power from the drive shaft to the spur gear to turn the latter in reverse direction, and a single means for locking all of the above means when any one of them is in active position, such means including a clutch pedal.

6. In a power transmission mechanism, a multiple gear, a plurality of gears, each meshing with one of the gears of the multiple gear, a drive shaft upon which said latter gears are loosely mounted, clutch members movable into engagement with the gears of the drive shaft to selectively lock them thereto, a control rod operatively connected to both clutch members, additional means for transmitting power from the drive shaft to one of the gears, a control rod for operating said additional means, and a hand lever movable to bring it into operative connection with either control rod to operate such rod.

7. In a power transmission mechanism, a multiple gear, a plurality of gears, each meshing with one of the gears of the multiple gear, a drive shaft upon which said latter gears are loosely mounted, clutch members movable into engagement with the gears of the drive shaft to selectively lock them thereto, a control rod operatively connected to both clutch members, additional means for transmitting power from the drive shaft to one of the gears, a control rod for operating said additional means, a hand lever movable to bring it into operative connection with either control rod to operate such rod, a clutch pedal, and means operable upon movement of the clutch pedal to one position for locking the control rods.

8. In a power transmission mechanism, a multiple gear, a plurality of gears, each meshing with one of the gears of the multiple gear, a drive shaft upon which said latter gears are loosely mounted, clutch members movable into engagement with the gears of the drive shaft to selectively lock them thereto, a control rod operatively connected to both clutch members, additional means for transmitting power from the drive shaft to one of the gears, a control rod for operating said additional means, a hand lever movable to bring it into operative connection with either control rod to operate such rod, a clutch pedal, and means operable upon movement of the clutch pedal to one position for locking the control rods, said means including a locking member movable to seat in notches formed in the control rods, a cam shaft for actuating such locking member, and operative connection between the clutch pedal and cam shaft.

9. In a power transmission mechanism, a drive shaft, beveled pinions mounted upon the drive shaft to rotate independently thereof, clutches fast to the drive shaft and movable to selectively lock the beveled pinions to the drive shaft, live axle sections, a differential mechanism connecting such axle sections and including a cage, a beveled gear loosely mounted upon one axle section and having its gear face recessed, a ring seated in the recess of the beveled gear and having teeth, whereby it forms a second beveled gear, these beveled gears meshing with the beveled pinions, and fastening means passed through the cage of the differential mechanism, the beveled gear and into the ring to secure the parts together.

10. In a power transmission mechanism, a beveled gear, a drive shaft, a compound gear freely mounted upon the drive shaft and including a spur gear and a beveled pinion, the latter at all times meshing with the beveled gear, means for locking the compound gear to the drive shaft, and means for transmitting power from the drive shaft to the compound gear when the latter is released from the drive shaft, said means including a pinion on the drive shaft, a jack shaft, gears movable longitudinally of the jack shaft, a second jack shaft, gears movable longitudinally of the second jack shaft, and means for simultaneously moving the gears of both jack shafts to bring one gear of the first jack shaft in mesh with the pinion of the drive shaft, one gear of the second jack shaft in mesh with the spur gear of the multiple gear, and the gears of the jack shafts in mesh with each other.

11. In a power transmission mechanism, a beveled gear, a drive shaft, a compound gear freely mounted upon the drive shaft and including a spur gear and a beveled pinion, the latter at all times meshing with the beveled gear, means for locking the compound gear to the drive shaft, and means for transmitting power from the drive shaft to the compound gear when the latter is released from the drive shaft, said means including a pinion on the drive shaft, a jack shaft, gears movable longitudinally of the jack shaft, a second jack shaft, gears movable longitudinally of the second jack shaft, and means for simultaneously moving the gears of both jack shafts to bring one gear of the first jack shaft in mesh with the pinion of the drive shaft, one gear of the second jack shaft in mesh with the spur gear of the multiple gear, and the gears of the jack shafts in mesh with each other, the movement of the gears along one jack shaft being opposite to that of the gears upon the other jack shaft.

12. In a power transmission mechanism, a beveled gear, a drive shaft, a compound gear freely mounted upon the drive shaft and including a spur gear and a beveled pinion, the latter at all times meshing with the beveled gear, means for locking the compound gear to the drive shaft, and means for transmitting power from the drive shaft to the compound gear when the latter is released from the drive shaft, said means including a pinion on the drive shaft, a jack shaft, gears movable longitudinally of the jack shaft, a second jack shaft, gears movable longitudinally of the second jack shaft, means for simultaneously moving the gears of both jack shafts to bring one gear of the first jack shaft in mesh with the pinion of the drive shaft, one gear of the second jack shaft in mesh with the spur gear of the multiple gear, and the gears of the jack shafts in mesh with each other, and means for locking the parts in position.

13. In a power transmission mechanism, a beveled gear, a drive shaft, a compound gear freely mounted upon the drive shaft and including a spur gear and a beveled pinion, the latter at all times meshing with the beveled gear, means for locking the compound gear to the drive shaft, and means for transmitting power from the drive shaft to the compound gear when the latter is released from the drive shaft, said means including a pinion on the drive shaft, a jack shaft, gears movable longitudinally of the jack shaft, a second jack shaft, gears movable longitudinally of the second jack shaft, and means for simultaneously moving the gears of both jack shafts to bring one gear of the first jack shaft in mesh with the pinion of the drive shaft, one gear of the second jack shaft in mesh with the spur gear of the multiple gear, and the gears of the jack shafts in mesh with each other, said means including shipper levers, one co-acting with the gears of one jack shaft and the other with the gears of the other jack shaft, reciprocally mounted control rods connected to the shipper levers, and a pivoted lever connected at its free ends to the control rods.

14. In a power transmission mechanism, a beveled gear, a drive shaft, a compound gear freely mounted upon the drive shaft and including a spur gear and a beveled pinion, the latter at all times meshing with the beveled gear, means for locking the compound gear to the drive shaft, and means for transmitting power from the drive shaft to the compound gear when the latter is released from the drive shaft, said means including a pinion on the drive shaft, a jack shaft, gears movable longitudinally of the jack shaft, a second jack shaft, gears movable longitudinally of the second jack shaft, and means for simultaneously moving the gears of both jack shafts to bring one gear of the first jack shaft in mesh with the pinion of the drive shaft, one gear of the second jack shaft in mesh with the spur gear of the multiple gear, and the gears of the jack shafts in mesh with each other, said means including shipper levers, one co-acting with the gears of one jack shaft and the other with the gears of the other jack shaft, reciprocally mounted control rods connected to the shipper levers, and a pivoted lever connected at its free ends to the control rods, one of the control rods having slotted connection with the latter lever to retard the movement of the gears actuated by the other control rod.

In testimony whereof I affix my signature in presence of two witnesses.

EDGAR J. WENDLE.

Witnesses:
 FRANK BRENDLE,
 PHILIP SCHILLINGER.

Copies of this patent may be obtained for five cents each, by addressing the "Commissioner of Patents, Washington, D. C."